US012151354B2

(12) United States Patent
Mizuno et al.

(10) Patent No.: US 12,151,354 B2
(45) Date of Patent: Nov. 26, 2024

(54) ELECTRIC POWER TOOL

(71) Applicant: Panasonic Intellectual Property Management Co., Ltd., Osaka (JP)

(72) Inventors: Mitsumasa Mizuno, Osaka (JP); Itaru Murui, Nara (JP); Atsushi Nakamura, Mie (JP)

(73) Assignee: Panasonic Intellectual Property Management. Co., Ltd., Osaka (JP)

( * ) Notice: Subject to any disclaimer, the term of this patent is extended or adjusted under 35 U.S.C. 154(b) by 0 days.

(21) Appl. No.: 17/049,911

(22) PCT Filed: Mar. 20, 2019

(86) PCT No.: PCT/JP2019/011788

§ 371 (c)(1),
(2) Date: Oct. 22, 2020

(87) PCT Pub. No.: WO2019/208038

PCT Pub. Date: Oct. 31, 2019

(65) Prior Publication Data

US 2021/0229256 A1 Jul. 29, 2021

(30) Foreign Application Priority Data

Apr. 25, 2018 (JP) ................................ 2018-084556

(51) Int. Cl.
*B25F 5/00* (2006.01)
*B25B 21/02* (2006.01)
*B25B 23/147* (2006.01)

(52) U.S. Cl.
CPC ............ *B25F 5/001* (2013.01); *B25B 21/026* (2013.01); *B25B 23/1475* (2013.01)

(58) Field of Classification Search
CPC .... B25F 5/001; B25B 21/026; B25B 23/1475
See application file for complete search history.

(56) References Cited

U.S. PATENT DOCUMENTS

| | | | | |
|---|---|---|---|---|
| 3,150,725 A * | 9/1964 | Hornschuch | ............ B25B 21/02 | 173/93 |
| 3,952,814 A * | 4/1976 | Gelfand | .................. B25B 21/02 | 173/93 |

(Continued)

FOREIGN PATENT DOCUMENTS

| | | |
|---|---|---|
| EP | 3689551 A1 | 8/2020 |
| JP | 2012-245463 A | 12/2012 |
| JP | 2015-113944 | 6/2015 |

OTHER PUBLICATIONS

European Office Action issued in corresponding European Patent Application No. 19793270.0, dated May 19, 2021.

(Continued)

*Primary Examiner* — Daniel Jeremy Leeds
(74) *Attorney, Agent, or Firm* — Rimon P.C.

(57) ABSTRACT

A torque transmission mechanism includes a magnet coupling including a driving magnet member coupled to a side of driving shaft driven into rotation by a motor and a driven magnet member coupled to a side of an output shaft on which a front-end tool is attachable. A clutch mechanism is provided between the motor and the torque transmission mechanism. A moment of inertia on the side of the driven magnet member is larger than a moment of inertia on the side of the driving magnet member.

4 Claims, 7 Drawing Sheets

(56) References Cited

U.S. PATENT DOCUMENTS

| | | | | |
|---|---|---|---|---|
| 6,945,337 | B2 | 9/2005 | Kawai et al. | |
| 7,216,723 | B2 * | 5/2007 | Ohtsu | B25B 21/02 173/2 |
| 9,289,886 | B2 * | 3/2016 | Limberg | B25B 23/1405 |
| 2005/0109519 | A1 | 5/2005 | Kawai et al. | |
| 2019/0199164 | A1 * | 6/2019 | Gieras | H02K 1/27 |
| 2020/0280252 | A1 | 9/2020 | Mizuno et al. | |

OTHER PUBLICATIONS

International Search Report issued in corresponding International Patent Application No. PCT/JP2019/011788, dated Jun. 18, 2019, with English translation.

* cited by examiner

ELECTRIC POWER TOOL

CROSS-REFERENCE OF RELATED APPLICATIONS

This application is the U.S. National Phase under 35 U.S.C. § 371 of International Patent Application No. PCT/JP2019/011788, filed on Mar. 20, 2019, which in turn claims the benefit of Japanese Application No. 2018-084556, filed Apr. 25, 2018, the entire disclosures of which applications are incorporated by reference herein.

TECHNICAL FIELD

The present disclosure relates to an electric power tool adapted to transmit a torque produced by the rotation of a driving shaft to an output shaft so as to rotate a front-end tool.

BACKGROUND ART

Patent 1 document discloses a tightening tool including a torque clutch mechanism configured such that a planetary gear deceleration mechanism is coupled to the rotary shaft of a motor and adapted to interrupt power transmission to the output shaft by idling a ring gear in the planetary gear mechanism in association with an increase in the load torque. Further, patent document 2 discloses a rotary impact tool in which a hammer is attached to the driving shaft via a cam mechanism and the hammer applies a striking impact in the rotational direction to the anvil to rotate the output shaft when a load of a predetermined value or greater is exerted on the output shaft.

[Patent Literature 1] JP2015-113944

[Patent Literature 2] JP2005-118910

SUMMARY OF INVENTION

Technical Problem

A related-art electric power tool employs a structure for transmitting a rotation torque of a motor to the output shaft mechanically and so produces noise when used. In particular, a mechanical rotary impact tool produces an impact torque when the hammer strikes the anvil and so produces a large impact noise. Therefore, development of an electric power tool that is excellent in quietness, with the impact torque being maintained, is called for.

The present disclosure addresses the issue discussed above and a purpose thereof is to provide an electric power tool that is excellent in quietness, with the transmitted torque being maintained.

Solution to Problem

An electric power tool according to an embodiment of the present disclosure includes: a driving shaft that is driven into rotation by a motor; an output shaft on which a front-end tool is attachable; a torque transmission mechanism that includes a magnet coupling including a driving magnet member coupled to the driving shaft side and a driven magnet member coupled to the output shaft side, a moment of inertia of the driven magnet member side being larger than a moment of inertia of the driving magnet member side; and a clutch mechanism provided between the motor and the torque transmission mechanism.

DESCRIPTION OF EMBODIMENTS

Figure 1:
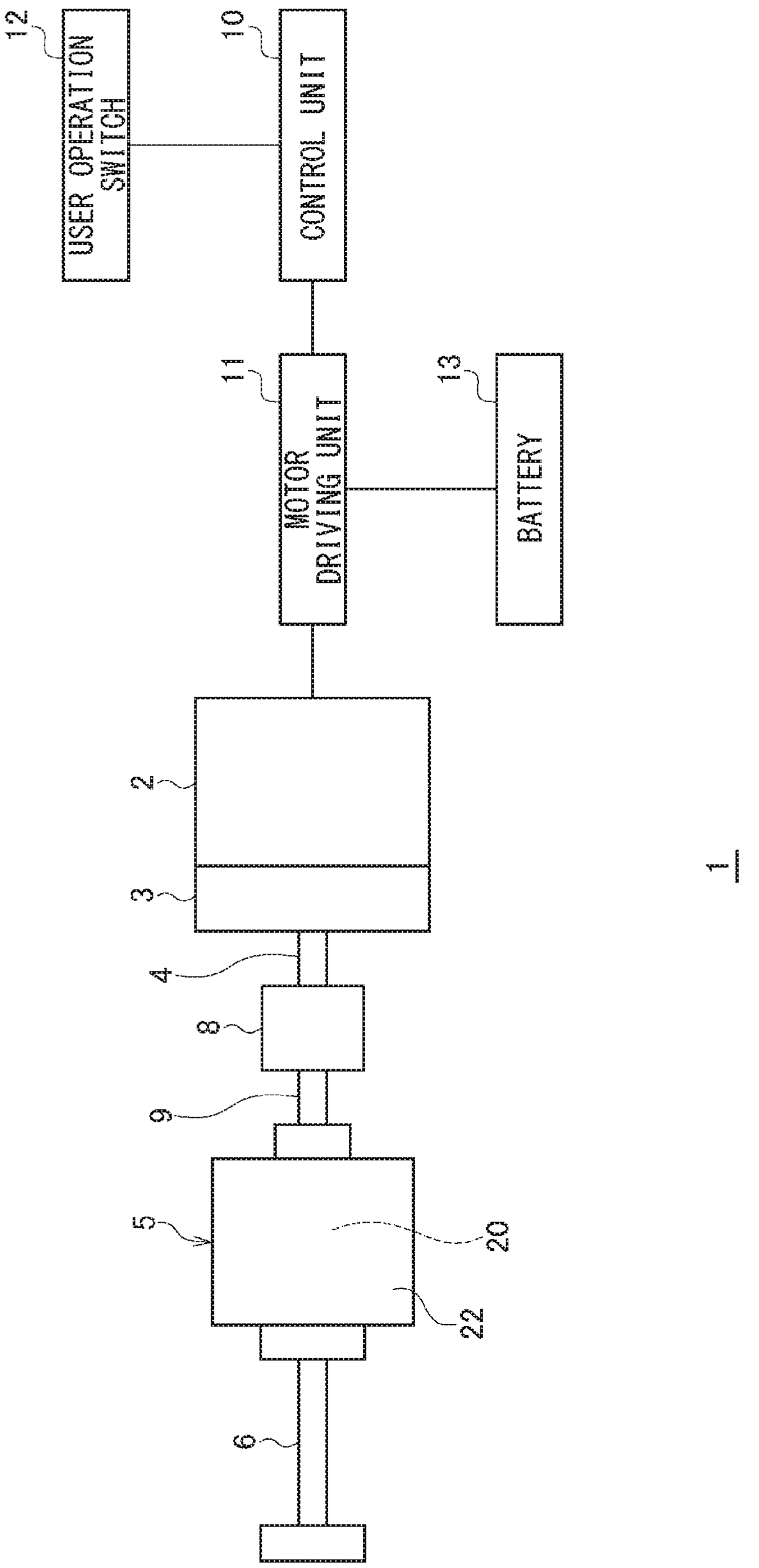
FIG. 1 shows an exemplary configuration of an electric power tool according to an embodiment of the present disclosure.

FIG. 1 shows an exemplary configuration of an electric power tool 1 according to an embodiment of the present disclosure. The electric power tool 1 is a rotary tool in which a motor 2 is a driving source and includes a driving shaft 4 driven into rotation by the motor 2, an output shaft 6 on which a front-end tool can be attached, a torque transmission mechanism 5 for transmitting the torque produced by the rotation of the driving shaft 4 to the output shaft 6, and a clutch mechanism 8 provided between the motor 2 and the torque transmission mechanism 5. The clutch mechanism 8 may be configured as a mechanical element that transmits the torque produced by the rotation of the driving shaft 4 to the torque transmission mechanism 5 via a coupling shaft 9 but does not transmit the torque the coupling shaft 9 receives from the torque transmission mechanism 5 to the driving shaft 4. The function of the clutch mechanism 8 will be described in detail later.

In the electric power tool 1, power is supplied by a battery 13 built in a battery pack. The motor 2 is driven by a motor driving unit 11, and the rotation of the rotary shaft of the motor 2 is decelerated by a decelerator 3 and transmitted to the driving shaft 4. The clutch mechanism 8 transmits the rotation torque of the driving shaft 4 to the torque transmission mechanism 5 via the coupling shaft 9.

Figure 2:
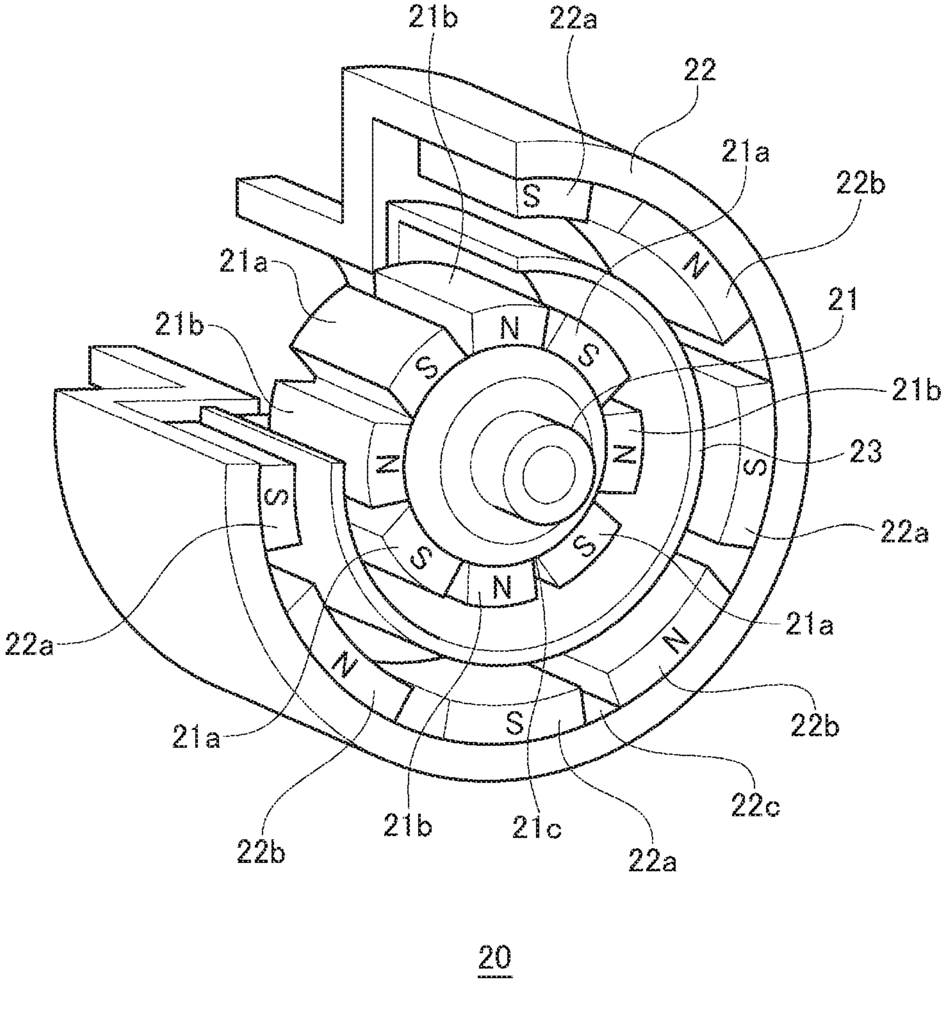
FIG. 2 shows an exemplary internal structure of the magnet coupling.

The torque transmission mechanism 5 according to the embodiment includes a magnet coupling 20 that enables contactless torque transmission. FIG. 2 shows an exemplary internal structure of the magnet coupling 20. FIG. 2 shows a perspective cross section in which a part of the cylinder-type magnet coupling 20 having an inner rotor and an outer rotor is cut out. S-poles and N-poles are alternately arranged adjacent to each other in the circumferential direction on the outer circumferential surface of the inner rotor cylinder and on the inner circumferential surface of the outer rotor cylinder. The magnet coupling 20 realizes superbly quiet torque transmission by magnetically transmitting the torque produced by the rotation of the driving shaft 4 to the output shaft 6. FIG. 2 shows the magnet coupling 20 of an eight-pole type, but the number of poles is not limited to eight.

The magnet coupling 20 includes a driving magnet member 21 coupled to the driving shaft 4 side, a driven magnet member 22 coupled to the output shaft 6 side, and a partition wall 23 provided between the driving magnet member 21 and the driven magnet member 22. In the magnet coupling 20 according to the embodiment, the driving magnet member 21 is an inner rotor, and the driven magnet member 22 is an outer rotor. The magnet coupling 20 is formed such that the moment of inertia of the driven magnet member 22 side is larger than the moment of inertia of the driving magnet member 21 side.

The outer circumferential surface of the driving magnet member 21 that embodies the inner rotor forms a magnetic surface 21*c* on which S-pole magnets 21*a* and N-pole magnets 21*b* are alternately arranged. Further, the inner circumferential surface of the driven magnet member 22 that embodies the outer rotor forms a magnetic surface 22*c* on which S-pole magnets 22*a* and N-pole magnets 22*b* are alternately arranged. The angular pitches of magnetic pole arrangement are configured to be equal in the magnetic surface 21*c* and the magnetic surface 22*c*. It is preferred that the S-pole magnets and the N-pole magnets be arranged alternately without creating gaps between the poles in the magnetic surface 21*c* and the magnetic surface 22*c*.

The driving magnet member 21 and the driven magnet member 22 are arranged coaxially such that the magnetic surface 21*c* and the magnetic surface 22*c* face each other. The attraction exerted between the S-pole magnet 21*a* and the N-pole magnet 22*b* and between the N-pole magnet 21*b* and the S-pole magnet 22*a* in the direction in which the magnets face defines the relative positions of the driving magnet member 21 and the driven magnet member 22.

The control unit 10 has the function of controlling the rotation of the motor 2. A user operation switch 12 is a trigger switch manipulated by a user. The control unit 10 turns the motor 2 on or off according to the manipulation of the user operation switch 12 and supplies the motor driving unit 11 with an instruction for driving determined by a manipulation variable of the user operation switch 12. The motor driving unit 11 controls the voltage applied to the motor 2 according to the instruction for driving supplied from the control unit 10 to adjust the number of revolutions of the motor.

By employing the magnet coupling 20, the electric power tool 1 is capable of transmitting a torque in a contactless manner and improving quietness of the tool. Further, by alternately arranging S-poles and N-poles adjacent to each other on the magnetic surface 21*c* and alternately arranging S-poles and N-poles adjacent to each other on the magnetic surface 22*c*, the magnet coupling 20 is capable of transmitting a larger torque as compared with a case of providing the S-poles and the N-poles at a distance.

A description will now be given of a case of configuring the electric power tool 1 as a rotary impact tool. The rotary impact tool has the function of applying a striking impact intermittently to a screw member such as a bolt subject to tightening in the rotational direction. This is met in the embodiment by allowing the magnet coupling 20 that forms the torque transmission mechanism 5 to have the function of applying an intermittent rotary impact force to the subject of tightening. The magnet coupling 20 applies an intermittent rotary impact force to the screw member subject to tightening via the front-end attached to the output shaft 6 by changing the magnetic force exerted between the magnetic surface 21*c* of the driving magnet member 21 and the magnetic surface 22*c* of the driven magnet member 22.

Unless a load torque equal to or beyond the maximum torque that can be transmitted is exerted, the driving magnet member 21 and the driven magnet member 22 of the magnet coupling 20 are rotated in synchronization, substantially maintaining the relative positions in the rotational direction. As the tightening of the screw member progresses and a load torque beyond the maximum torque that can be transmitted by the magnet coupling 20 is exerted on the output shaft 6, however, the driven magnet member 22 will be unable to follow the driving magnet member 21. The state in which the driving magnet member 21 and the driven magnet member 22 are not synchronized will be referred to as "loss of synchronization".

Figure 3:
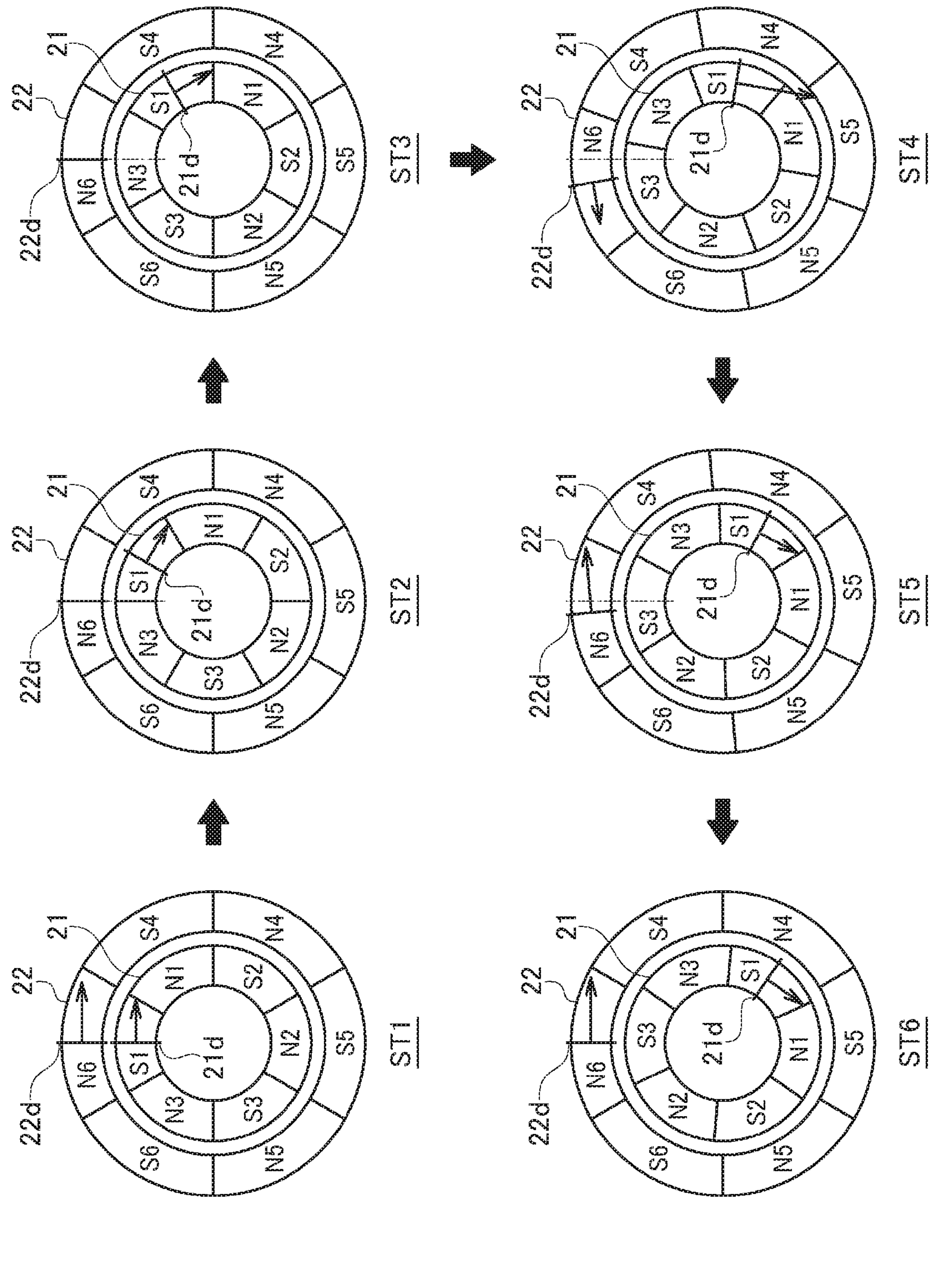
FIG. 3 shows a state transition of the magnet coupling.

FIG. 3 shows a state transition of the magnet coupling 20. The figure shows a state transition occurring when a bolt is tightened by the front-end tool attached to the output shaft 6. FIG. 3 shows relative positions of the driving magnet member 21 and the driven magnet member 22 in the rotational direction in a 6-pole type magnet coupling 20. Magnets S1, S2, S3 and magnets N1, N2, N3 are the S-pole magnet 21*a* and the N-pole magnet 21*b* in the driving magnet member 21, respectively, and magnets S4, S5, S6 and magnets N4, N5, N6 are the S-pole magnet 22*a* and the N-pole magnet 22*b* in the driven magnet member 22, respectively.

The state ST1 is defined as a state in which the driving magnet member 21 is driven into rotation by the motor 2, and the driving magnet member 21 and the driven magnet member 22 are rotated in tandem, maintaining the relative synchronous positions. During the synchronous rotation, the driven magnet member 22 is rotated by following the rotation of the driving magnet member 21 so that the driven magnet member 22 is slightly behind the driving magnet member 21 in phase, but the members are illustrated as being in the same phase in the state ST1. To facilitate the understanding of the relative phases of the members, a reference position 22*d* of the magnet N6 and a reference position 21*d* of the magnet S1, which are in the same phase in the state ST1, are defined.

The state ST2 is defined as a state that occurs immediately before the driven magnet member 22 can no longer follow the driving magnet member 21. When a load torque beyond the maximum torque that can be transmitted by the magnet coupling 20 is exerted on the output shaft 6 while the bolt is being tightened, the rotation of the driven magnet member 22 coupled to the output shaft 6 side is stopped, and the driving magnet member 21 starts idling relative to the driven magnet member 22.

The state ST3 occurs while synchronization is being lost and is defined as a state in which the repulsive magnetic force exerted between the driving magnet member 21 and the driven magnet member 22 reaches the maximum level. Between the state ST2 and the state ST3, the driving magnet member 21 is rotated by the driving shaft 4.

The state ST4 occurs while synchronization is being lost and is defined as a state in which the driving magnet member 21 and the driven magnet member 22 receive the impact of the repulsive forces of the respective magnets and are moved in the rotational directions opposite to each other. In this case, the driving magnet member 21 that embodies the inner rotor is accelerated to be rotated at a speed higher than the speed at which the motor 2 rotates the driving shaft 4. Meanwhile, the driven magnet member 22 is rotated in the reverse direction from the stopping position. Since the driven magnet member 22 is coupled to the output shaft 6 side, the rotation of the driven magnet member 22 in the reverse direction will be the rotation in the direction to loosen the bolt subject to tightening. Thus, it is preferred to control the maximum angle of rotation of the driven magnet member 22 in the reverse direction to be smaller than the rotational allowance angle of the front-end tool in the state ST4. The rotational allowance angle of the front-end tool may be defined as an angle derived from adding the allowance angle between the front-end tool and the output shaft 6 to the allowance angle between the front-end tool and the bolt subject to tightening.

When loss of synchronization is started in the state ST3 in this way, the driving magnet member 21 and the driven magnet member 22 are moved in the rotational directions opposite to each other in the state ST4. To focus on the magnet S1 for the purpose of discussing the operation of the driving magnet member 21, the maximum repulsive magnetic force is exerted between the magnet S1 and the magnet S4 in the state ST3. As the driving magnet member 21 is rotated further beyond the state ST3, the magnet S1 is driven by the repulsive magnetic force of the magnet S4 in the rotational direction away from the magnet S4 and is attracted by the attractive magnetic force of the magnet N4 into the rotational direction. Like the magnet S1, the other magnets S2-S3 and magnets N1-N3 in the driving magnet member 21 receive a magnetic force from the driven magnet member 22 similarly. In the state ST4, therefore, the driving magnet member 21 is rotated at a speed higher than the speed at which the motor 2 rotates the driving shaft 4.

To focus on the magnet S4 for the purpose of discussing the operation of the driven magnet member 22, the maximum repulsive magnetic force is exerted between the magnet S4 and the magnet S1 in the state ST3. As the driving magnet member 21 is rotated further beyond the state ST3, the magnet S4 is driven by the repulsive magnetic force of the magnet S1 in the reverse rotational direction away from the magnet S1 and is attracted by the attractive magnetic force of the magnet N3 into the reverse rotational direction. Like the magnet S4, the other magnets S5-S6 and magnets N4-N6 in the driven magnet member 22 receive a magnetic force from the driving magnet member 21 similarly. In the state ST4, therefore, the driven magnet member 22 is rotated in a direction opposite to the rotational direction of the driving magnet member 21.

The state ST5 is defined as a state in which the driven magnet member 22 put into reverse rotation in the state ST4 is rotated in the normal direction, i.e., the direction in which the front-end tool tightens the bolt. In the electric power tool 1, the driving magnet member 21 is prevented by the clutch mechanism 8 to be put into reverse rotation and is always normally rotated. After being put into reverse rotation in the state ST4, the driven magnet member 22 is caused by the attractive magnetic force of the normally rotating driving magnetic member 21 to be rotated in the normal direction toward the previous stopping position (the position to tighten the bolt).

The state ST6 is defined as a state in which the driven magnet member 22 is normally rotated as far as the previous stopping position in the state ST1 so as to transmit the rotary impact force to the bolt. The magnet coupling 20 applies an intermittent rotary impact force to the bolt by repeating the state transition from the state ST2 to the state ST6.

As described above, the torque transmission mechanism 5 according to the embodiment generates an intermittent rotary impact force by using loss of synchronization in the magnet coupling 20. As described above, the driving magnet member 21 is rotated in the state ST4 at a speed higher than the speed at which the motor 2 rotates the driving shaft 4. If the driving magnet member 21 and the driving shaft 4 are coupled without any freedom, therefore, the driving shaft 4 and the driving magnet member 21 will be rotated as one piece, causing the motor 2 to function as a generator and damp the rotation of the driving magnet member 21 as a result, i.e., to function as a brake that slows the rotation speed.

This is addressed in the embodiment by providing the clutch mechanism 8 between the motor 2 and the torque transmission mechanism 5 to interrupt torque transmission between the driving shaft 4 and the driving magnet member 21 when the driving magnet member 21 is rotated at a speed higher than the speed of rotation by the motor 2 in the state ST4.

The clutch mechanism 8 according to the embodiment transmits the torque produced by the rotation of the driving shaft 4 to the driving magnet member 21 via the coupling shaft 9 but does not transmit the torque the driving magnet member 21 receives from the driven magnet member 22, i.e., the rotation torque produced by the attractive magnetic force in the direction of advancement, to the driving shaft 4. The clutch mechanism 8 may be a mechanical element that transmits a torque applied to the input side to the output side but does not transmit a torque (reverse input torque) applied to the output side to the input side.

The clutch mechanism 8 may include a one-way clutch. The one-way clutch is arranged between the motor 2 and the torque transmission mechanism 5 so as to interrupt torque transmission between the driving magnet member 21 and the driving shaft 4 when the driving magnet member 21 is rotated normally at a speed higher than the speed at which the motor 2 rotates the driving shaft 4 normally.

Figure 4A:
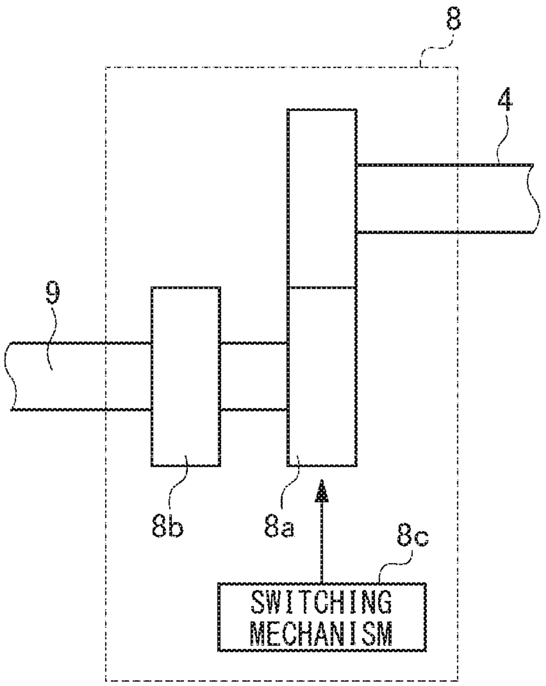
FIGS. 4A and 4B show an example of the clutch mechanism.
Figure 4B:
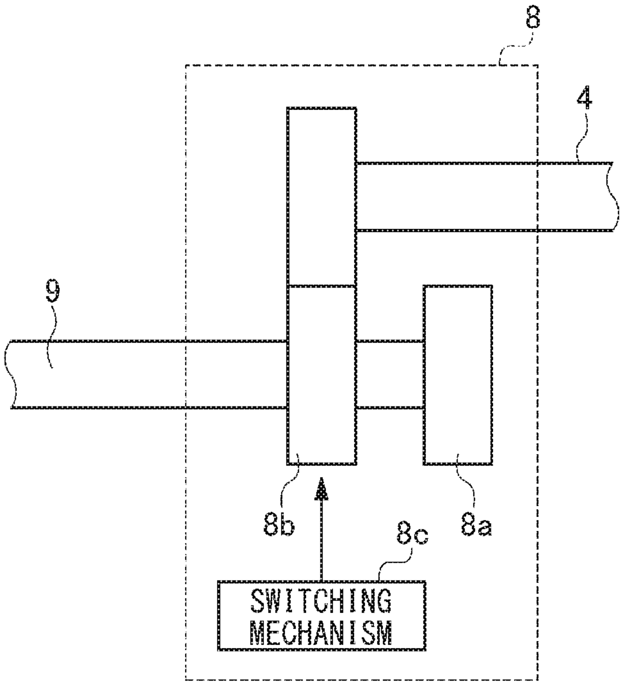

FIGS. 4A and 4B show an example of the clutch mechanism 8 comprised of a pair of one-way clutches adapted to transmit a torque in opposite directions. The clutch mechanism 8 includes a pair of first one-way clutch **8*a* and second one-way clutch 8*b*. For example, the first one-way clutch 8*a* transmits a torque in a direction of normal rotation of the motor 2, and the second one-way clutch 8*b* transmits a torque in a direction of reverse rotation of the motor 2. A switching mechanism 8*c* places one of the first one-way clutch 8*a* and the second one-way clutch 8*b* of the pair between the motor 2 and the torque transmission mechanism 5**.

FIG. 4A shows a state in which the first one-way clutch **8*a* is coupled by the switching mechanism 8*c* to the driving shaft 4. The user attempting to tighten a bolt manipulates the switching mechanism 8*c* to couple the first one-way clutch 8*a* to the driving shaft 4. FIG. 4B shows a state in which the second one-way clutch 8*b* is coupled by the switching mechanism 8*c* to the driving shaft 4. The user attempting to loosen a bolt manipulates the switching mechanism 8*c* to couple the second one-way clutch 8*b* to the driving shaft 4**.

By configuring the clutch mechanism 8 to include a pair of one-way clutches capable of transmitting a torque in opposite directions in such a manner that one of the clutches is switched into use, the user can use the electric power tool 1 both in a job of tightening a screw member and a job of loosening a screw member. The clutch mechanism 8 may be comprised of a two-way clutch capable of switching a direction of torque transmission.

The clutch mechanism 8 may be comprised of a reverse input cut-off clutch that does not transmit a torque that the driving magnet member 21 receives from the driven magnet member 22 to the driving shaft 4. The reverse input cut-off clutch is formed to transmit a torque applied to the input side to the output side but not to transmit a torque (reverse input torque) applied to the output side to the input side regardless of the direction of rotation. By configuring the clutch mechanism 8 to include a reverse input cut-off clutch, therefore, the electric power tool 1 can be used both in a job of tightening a screw member and a job of loosening a screw member without requiring the user to manipulate and switch the clutch.

Referring back to FIG. 3, the driven magnet member 22 of the electric power tool 1 is put into reverse rotation in the state ST4. Subsequently, in the state ST5, the driven magnet member 22 is accelerated by the driving magnet member 21 rotated normally to generate a rotary impact force in the state ST6. The inventors have focused on the moment of inertia of the magnet coupling 20 and have conducted a simulation to analyze a proper ratio between the output side moment of inertia and the input side moment of inertia for generating a large rotary impact force.

The result of analysis obtained by the simulation will be shown below. In the simulation result shown in FIGS. 5A-7C, different ratios between the moment of inertia of the driven magnet member 22 on the output side and the moment of inertia of the driving magnet member 21 on the input side are defined, and the torque value applied to the bolt as a rotary impact force is computed accordingly. The simulation was conducted on the condition that the bolt subject to tightening is fixed, and the output shaft has certain elasticity. Hereinafter, the moment of inertia on the side of the driving magnet member 21 will be referred to as "input side moment of inertia", and the moment of inertia on the side of the driven magnet member 22 will be referred to as "output side moment of inertia". The output side moment of inertia may be derived by also including the front-end tool attached to the output shaft 6 into the computation.

Figure 5A:
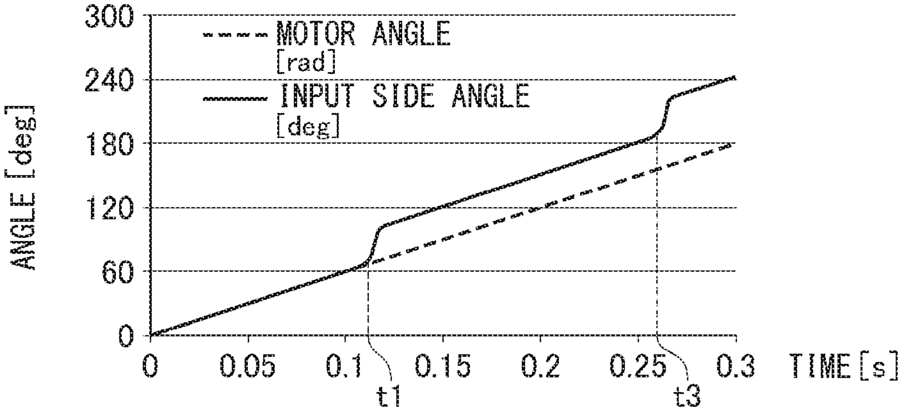
FIG. 5A-5C show an exemplary simulation result.
Figure 5B:
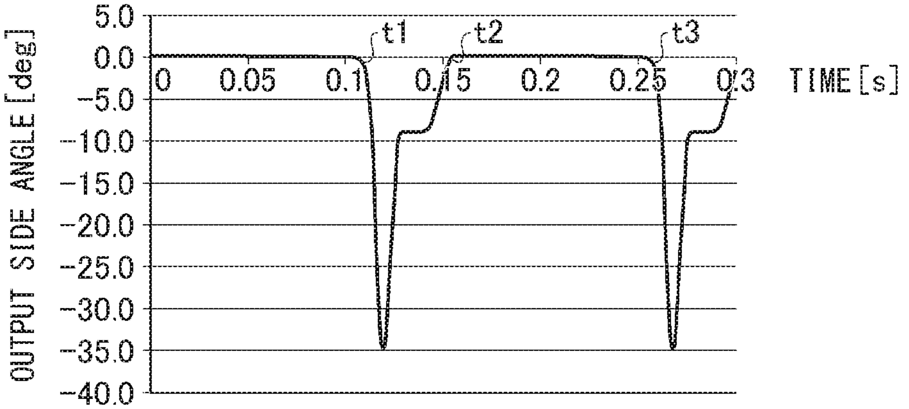
Figure 5C:
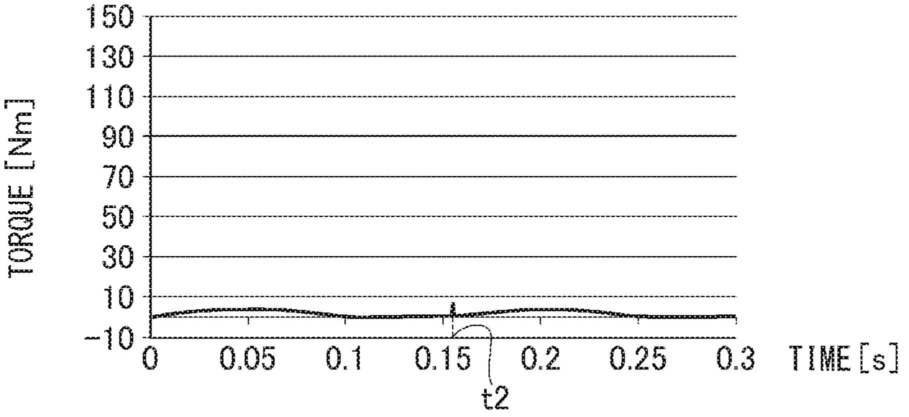

FIG. 5A-5C show a simulation result obtained when the output side moment of inertia and the input side moment of inertia are defined to be equal. FIG. 5A shows the angle of rotation of the motor 2 and the angle of rotation of the driving magnet member 21, FIG. 5B shows the angle of rotation of the driven magnet member 22, and FIG. 5C shows the torque value applied to the bolt subject to tightening.

The driving magnet member 21 and the motor 2 are rotated in tandem until time t1. At time t1, the magnet coupling 20 is in the state ST3 (see FIG. 3) and starts to lose synchronization. After time t1, the driving magnet member 21 and the driven magnet member 22 are accelerated in the directions of rotation opposite to each other due to the repulsive forces of the respective magnets. FIG. 5A shows that the rotation of the driving magnet member 21 is accelerated to result in a rotation angle larger than that of the motor 2, and FIG. 5B shows that the driven magnet member 22 is rotated in the reverse direction. The driving magnet member 21 is accelerated by the repulsive force of the magnet and is then rotated in tandem with the motor 2 again until time t3.

In the example shown in FIG. 5B, the driven magnet member 22 is rotated in the reverse direction by about 35° after the loss of synchronization. The driven magnet member 22 is then attracted by the driving magnet member 21 rotated normally and returns at time t2 to the angle that occurred before the reverse rotation (state ST6), allowing the front-end tool to apply a tightening torque to the bolt. FIG. 5C shows that a tightening torque less than 10 Nm occurs at time t2.

When the loss of synchronization in the magnet coupling 20 starts, the driving magnet member 21 and the driven magnet member 22 receive torques of the same magnitude in mutually opposite directions. The torques in the opposite directions rotates the driving magnet member 21 in the direction of normal rotation and rotates the driven magnet member 22 in the direction of reverse rotation. Theoretically, the driving magnet member 21 and the driven magnet member 22 are rotated in mutually opposite directions until the relative angle of rotation is substantially equal to the pitch angle (60°).

When the magnitude of the input side moment of inertia and the magnitude of the output side moment of inertia are defined to be equal in the simulation condition, the driving magnet member 21 and the driven magnet member 22 are rotated by the same angle in the mutually opposite directions. Therefore, the driving magnet member 21 is rotated in the normal direction by about 30°, and the driven magnet member 22 is rotated in the reverse direction by about 30°. In the actual simulation, the output shaft is provided with certain elasticity so that the driven magnet member 22 behaves in such a way that it is rotated in the reverse direction by about 35° (FIG. 5B).

When the driven magnet member 22 returns at time t2 to the previous angle that occurred before the reverse rotation, therefore, the driven magnet member 22 is already synchronized with the rotation of the driving magnet member 21. Therefore, at time t2, the driven magnet member 22 will be rotated at the rotation speed of the motor along with the driving magnet member 21 with the result that the tightening torque applied to the bolt is not so great.

Figure 6A:
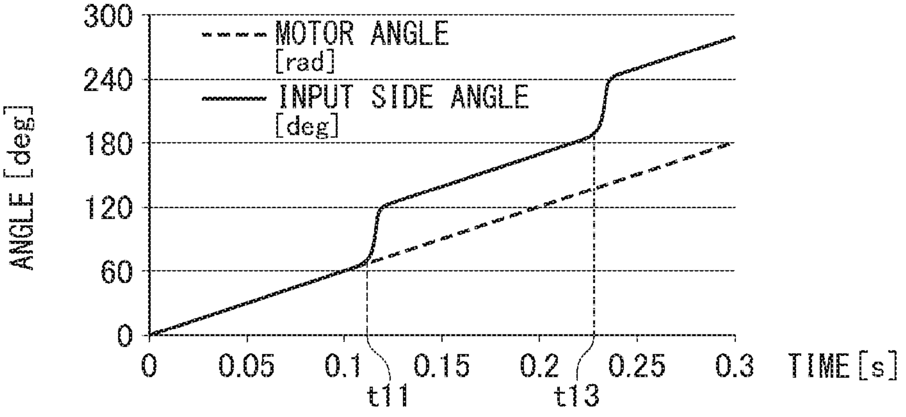
FIGS. 6A-6C show another exemplary simulation result.
Figure 6B:
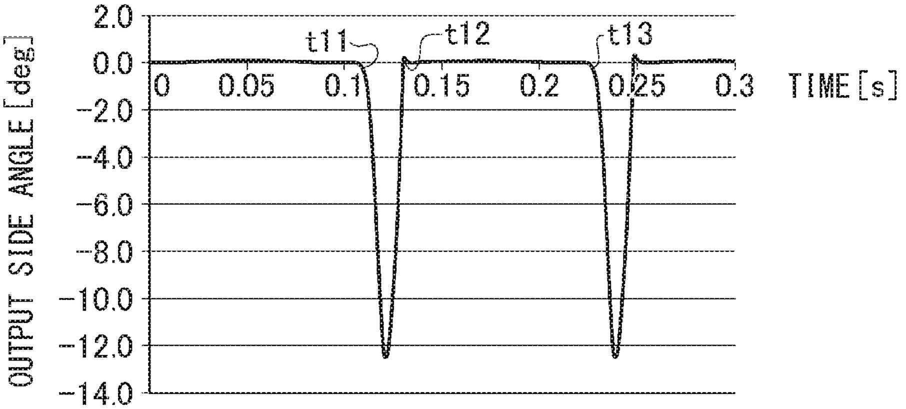
Figure 6C:
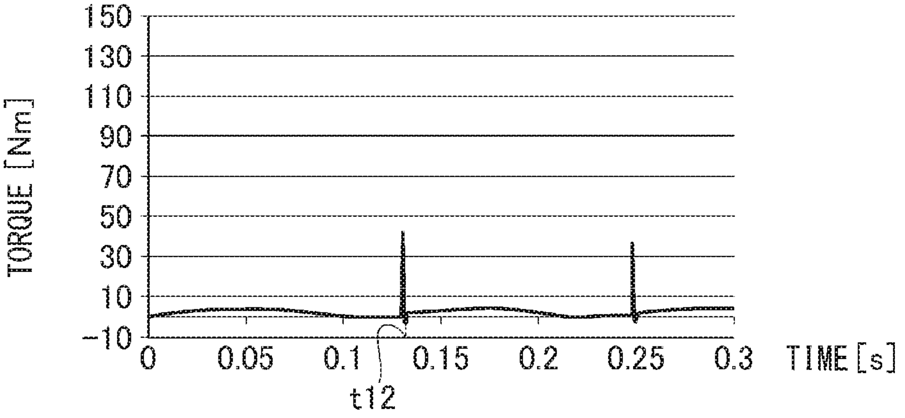

FIGS. 6A-6C show a simulation result obtained when the output side moment of inertia is 10 times the input side moment of inertia. FIG. 6A shows the angle of rotation of the motor 2 and the angle of rotation of the driving magnet member 21, FIG. 6B shows the angle of rotation of the driven magnet member 22, and FIG. 6C shows the torque value applied to the bolt subject to tightening.

The driving magnet member 21 and the motor 2 are rotated in tandem until time t11. At time t11, the magnet coupling 20 is in the state ST3 (see FIG. 3) and starts to lose synchronization. After time t11, the driving magnet member 21 and the driven magnet member 22 are accelerated in the directions of rotation opposite to each other due to the repulsive forces of the respective magnets. FIG. 6A shows that the rotation of the driving magnet member 21 is accelerated to result in a rotation angle larger than that of the motor 2, and FIG. 6B shows that the driven magnet member 22 is rotated in the reverse direction. The driving magnet member 21 is accelerated by the repulsive force of the magnet and is then rotated in tandem with the motor 2 again until time t13.

In the example shown in FIG. 6B, the driven magnet member 22 is rotated in the reverse direction by about 12° after the loss of synchronization. The driven magnet member 22 is then attracted by the driving magnet member 21 rotated normally and returns at time t12 to the angle that occurred before the reverse rotation (state ST6), allowing the front-end tool to apply a tightening torque to the bolt. FIG. 6C shows that a tightening torque in excess of 40 Nm occurs at time t12. As compared with the tightening torque shown in FIG. 5C, the tightening torque is increased by defining the output side moment of inertia to be larger than the input side moment of inertia.

By defining the output side moment of inertia to be larger than the input side moment of inertia in the simulation condition shown in FIGS. 6A-6C, the angle by which the driven magnet member 22 is rotated in the reverse direction when the synchronization is lost is configured to be smaller than the angle by which the driving magnet member 21 is rotated in the normal direction. The driven magnet member 22 rotated in the reverse direction is subsequently attracted by the magnet of the driving magnet member 21 and is accelerated in the direction of normal rotation. The driven magnet member 22 can generate a large tightening torque by returning to the previous angle that occurred before the reverse rotation before being synchronized with the driving magnet member 21, i.e., during the acceleration in the direction of normal rotation. The simulation result shows that the magnet coupling 20 can transmit a large tightening torque to the bolt by configuring the output side moment of inertial to be larger than the input side moment of inertia.

Figure 7A:
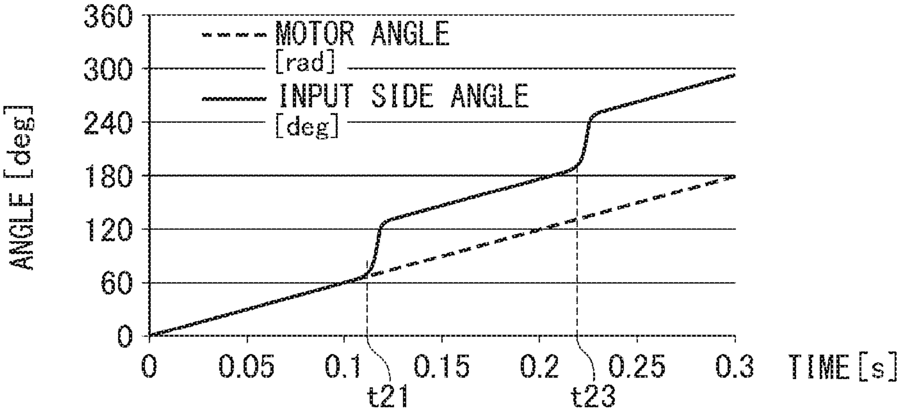
FIGS. 7A-7C show still another exemplary simulation result.
Figure 7B:
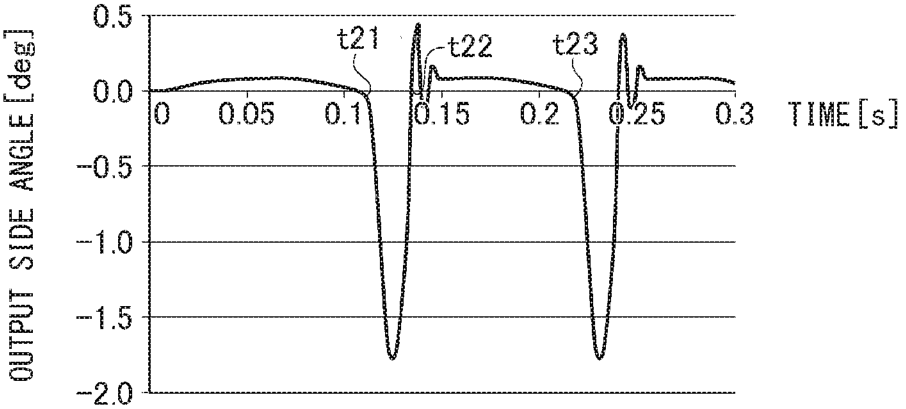
Figure 7C:
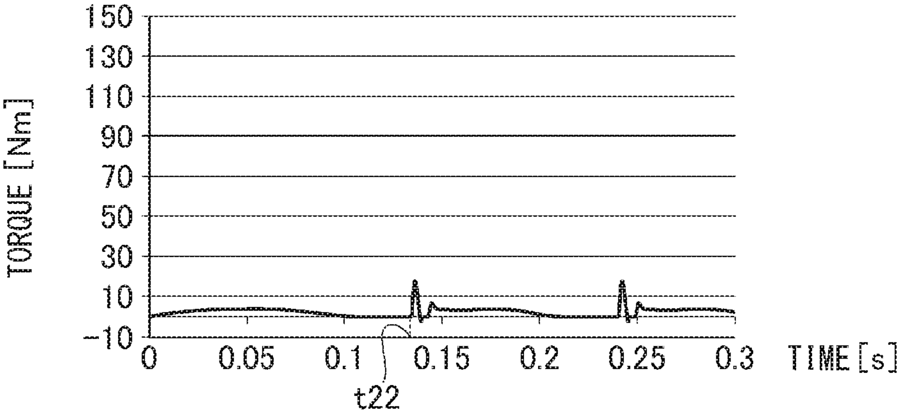

FIGS. 7A-7C show a simulation result obtained when the output side moment of inertia is 100 times the input side moment of inertia. The ratio between the output side moment of inertia and the input side moment of inertia is defined to be larger than that of the simulation condition in FIGS. 6A-6C. FIG. 7A shows the angle of rotation of the motor 2 and the angle of rotation of the driving magnet member 21, FIG. 7B shows the angle of rotation of the driven magnet member 22, and FIG. 7C shows the torque value applied to the bolt subject to tightening.

The driving magnet member 21 and the motor 2 are rotated in tandem until time t21. At time t21, the magnet coupling 20 is in the state ST3 (see FIG. 3) and starts to lose synchronization. After time t21, the driving magnet member 21 and the driven magnet member 22 are accelerated in the directions of rotation opposite to each other due to the repulsive forces of the respective magnets. FIG. 7A shows that the rotation of the driving magnet member 21 is accelerated to result in a rotation angle larger than that of the motor 2, and FIG. 7B shows that the driven magnet member 22 is rotated in the reverse direction. The driving magnet member 21 is accelerated by the repulsive force of the magnet and is then rotated in tandem with the motor 2 again until time t23.

In the example shown in FIG. 7B, the driven magnet member 22 is rotated in the reverse direction by about 1.75° after the loss of synchronization. The driven magnet member 22 is then attracted by the driving magnet member 21 rotated normally and returns at time t22 to the angle that occurred before the reverse rotation (state ST6), allowing the front-end tool to apply a tightening torque to the bolt. FIG. 7C shows that a tightening torque less than 20 Nm occurs at time t22. As compared with the tightening torque shown in FIG. 5C, the tightening torque is increased by defining the output side moment of inertia to be larger than the input side moment of inertia. This demonstrates that the tightening torque is increased by defining the output side moment of inertia to be larger than the input side moment of inertia.

Comparing then the tightening torques shown in FIG. 7C and FIG. 6C, it is revealed that the tightening torque is higher when the moment of inertia ratio (=output side moment of inertia/input side moment of inertia) is 10 than when the moment of inertial ratio is 100. The inventors have studied the factor behind this phenomenon and focused on the fact that the larger the moment of inertia ratio, the smaller the angle of reverse rotation of the driven magnet member 22 in the event of the loss of synchronization. If the angle of reverse rotation in the event of the loss of synchronization is small, the stroke of the driven magnet member 22 that occurs until it returns to the previous angle that occurred before the reverse rotation is short so that the driven magnet member 22 is not sufficiently accelerated by the attracting magnet of the driving magnet member 21 when the driven magnet member 22 returns to the previous angle. The inventors have thus found that the tightening torque will be higher than when the moment of inertia ratio is 1, but the moment of inertia ratio that is too large fails to accelerate the driven magnet member 22 sufficiently so that the tightening torque will not be sufficiently large.

Based on the simulation results shown in FIGS. 5A-7C, the inventors have confirmed that the moment of inertia ratio larger than 1 makes it possible to obtain a larger tightening torque than when the moment of inertia ratio is 1. The inventors further confirmed that a high tightening torque is realized by defining the moment of inertia ratio to be less than 100, i.e., defining the moment of inertia on the side of the driven magnet member 22 to be less than 100 times the moment of inertia on the side of the driving magnet member 21.

In the embodiment, the driving magnet member 21 is configured as the inner rotor, and the driven magnet member 22 is configured as the outer rotor in the magnet coupling 20. As compared with the case of configuring the driven magnet member 22 as the inner rotor, configuring the driven magnet member 22 as the outer rotor makes it possible to reduce the weight of the magnet coupling 20 having a moment of inertia ratio larger than 1.

Described above is an explanation based on an embodiment. The embodiment is intended to be illustrative only and it will be understood by those skilled in the art that various modifications to constituting elements and processes could be developed and that such modifications are also within the scope of the present disclosure.

An embodiment of the present disclosure is summarized below. An electric power tool (1) according to an embodiment of the present disclosure includes: a driving shaft (4) that is driven into rotation by a motor (2); an output shaft (6) on which a front-end tool is attachable; a torque transmission mechanism (5) that includes a magnet coupling (20) including a driving magnet member (21) coupled to the driving shaft side and a driven magnet member (22) coupled to the output shaft side, a moment of inertia on the side of the driven magnet member being larger than a moment of inertia on the side of the driving magnet member; and a clutch mechanism (8) provided between the motor (2) and the torque transmission mechanism (5).

It is preferred that the moment of inertia on the side of the driven magnet member be less than 100 times the moment of inertia on the side of the driving magnet member. It is preferred that the driving magnet member (21) be an inner rotor, and the driven magnet member (22) be an outer rotor.

REFERENCE SIGNS LIST

1 . . . electric power tool, 2 . . . motor, 4 . . . driving shaft, 5 . . . torque transmission mechanism, 6 . . . output shaft, 8 . . . clutch mechanism, 10 . . . control unit, 20 . . . magnet coupling, 21 . . . driving magnet member, 22 . . . driven magnet member

INDUSTRIAL APPLICABILITY

The present disclosure is applicable to the field of electric power tools.

The invention claimed is:

1. An electric power tool comprising: a driving shaft that is driven into rotation by a motor; an output shaft on which a front-end tool is attachable; a torque transmission mechanism that includes a magnet coupling including a driving magnet member coupled to a driving shaft side and a driven magnet member coupled to an output shaft side, a moment of inertia on a driven magnet member side being larger than a moment of inertia on a driving magnet member side; and a clutch mechanism provided between the motor and the torque transmission mechanism, wherein, the electric power tool is configured such that, when synchronization between the driving magnet member and the driven magnet member is lost, an angular velocity by which the driven magnet member is rotated in a reverse direction is smaller than an angular velocity by which the driving magnet member is rotated in a normal direction.

2. The electric power tool according to claim 1, wherein the moment of inertia on the driven magnet member side is less than 100 times the moment of inertia on the driving magnet member side.

3. The electric power tool according to claim 1, wherein the driving magnet member is an inner rotor, and the driven magnet member is an outer rotor.

4. The electric power tool according to claim 2, wherein the driving magnet member is an inner rotor, and the driven magnet member is an outer rotor.

* * * * *